United States Patent
Fyten et al.

(10) Patent No.: US 7,059,409 B2
(45) Date of Patent: Jun. 13, 2006

(54) METHODS OF CEMENTING AND CEMENT COMPOSITIONS CONTAINING A POLYMERIC CEMENT COHESION ADDITIVE

(75) Inventors: Glen C. Fyten, Red Deer (CA); Donald A. Getzlaf, Calgary (CA)

(73) Assignee: Halliburton Energy Services, Inc., Duncan, OK (US)

( * ) Notice: Subject to any disclaimer, the term of this patent is extended or adjusted under 35 U.S.C. 154(b) by 20 days.

(21) Appl. No.: 10/900,651

(22) Filed: Jul. 28, 2004

(65) Prior Publication Data

US 2006/0021751 A1 Feb. 2, 2006

(51) Int. Cl.
*E21B 33/138* (2006.01)
(52) U.S. Cl. .................... 166/294; 166/300
(58) Field of Classification Search ............ None
See application file for complete search history.

(56) References Cited

U.S. PATENT DOCUMENTS

| | | | |
|---|---|---|---|
| 3,959,003 A | 5/1976 | Ostroot et al. ............ 106/93 |
| 4,433,731 A | 2/1984 | Chatterji et al. ........... 166/293 |
| 4,455,169 A | 6/1984 | Chatterji et al. ........... 106/93 |
| 4,573,534 A * | 3/1986 | Baker et al. ............... 166/293 |
| 4,687,516 A | 8/1987 | Burkhalter et al. ......... 106/90 |
| 5,133,409 A | 7/1992 | Bour et al. ................ 166/293 |
| 5,147,565 A | 9/1992 | Bour et al. ............... 252/8.551 |
| 5,151,131 A | 9/1992 | Burkhalter et al. ......... 106/822 |
| 5,207,831 A | 5/1993 | Cowan ..................... 106/724 |
| 5,298,070 A | 3/1994 | Cowan ..................... 106/724 |
| 5,588,489 A | 12/1996 | Chatterji et al. ........... 166/293 |
| 5,696,059 A | 12/1997 | Onan et al. ................ 507/269 |
| 5,711,801 A | 1/1998 | Chatterji et al. ........... 106/789 |
| 5,997,633 A | 12/1999 | Montgomery .............. 106/804 |
| 6,063,738 A | 5/2000 | Chatterji et al. ........... 507/269 |
| 6,227,294 B1 | 5/2001 | Chatterji et al. ........... 166/293 |
| 6,405,801 B1 | 6/2002 | Vijn et al. ................. 166/293 |
| 6,419,016 B1 | 7/2002 | Reddy .................... 166/293 |
| 6,591,910 B1 | 7/2003 | Chatterji et al. ........... 166/293 |
| 6,592,660 B1 * | 7/2003 | Nguyen et al. ............ 106/677 |
| 6,619,399 B1 | 9/2003 | Chatterji et al. ........... 166/293 |
| 6,626,992 B1 | 9/2003 | Vijn et al. ................. 106/726 |
| 6,644,405 B1 | 11/2003 | Vijn et al. ................. 166/293 |
| 6,708,760 B1 | 3/2004 | Chatterji et al. ........... 166/294 |
| 6,730,636 B1 | 5/2004 | Vijn et al. |
| 6,855,200 B1 | 2/2005 | De Marco ................ 106/737 |
| 2004/0094069 A1 | 5/2004 | Chatterji et al. ........... 106/805 |

OTHER PUBLICATIONS

Halliburton brochure entitled "AQF-2 Foaming Agent" dated 1999.
Halliburton brochure entitled "Howco-Suds Surfactant" dated 1999.

* cited by examiner

*Primary Examiner*—Zakiya W. Bates
(74) *Attorney, Agent, or Firm*—Craig W. Roddy; Haynes & Boone L.L.P.

(57) ABSTRACT

A method and cementing composition is provided for sealing a subterranean zone penetrated by a well bore, wherein the cementing composition comprises a mixture of cementitious material, a polymeric cement cohesion additive, and sufficient water to form a slurry. The polymeric cement cohesion additive is a high molecular weight hydroxyethylcellulose. The method comprises placing the cement composition in the subterranean zone and allowing the cement composition to set into a solid mass therein.

18 Claims, No Drawings

METHODS OF CEMENTING AND CEMENT COMPOSITIONS CONTAINING A POLYMERIC CEMENT COHESION ADDITIVE

BACKGROUND

The present embodiment relates generally to a method of cementing and cementing compositions for sealing a subterranean zone penetrated by a well bore.

In the drilling and completion of an oil or gas well, a cementing composition is often introduced in the well bore for cementing pipe string or casing. In this process, known as "primary cementing," the cementing composition is pumped into the annular space between the walls of the well bore and the casing. The cementing composition sets in the annular space, supporting and positioning the casing, and forming a substantially impermeable barrier, or cement sheath, which isolates the well bore into subterranean zones. The objective of primary cementing is to prevent the undesirable migration of fluids between such subterranean zones.

Conventional cement compositions, however, mix readily with fluids in the well bore. It has been found that the admixture of as little as two percent of well bore fluid with a cement slurry will contaminate the cement slurry and degrade the competency of the slurry.

Balanced plugs and wells cemented in the presence of oil-based drilling muds (invert muds) are susceptible to well bore fluid contamination during placement. When a cement plug is contaminated with as little as two percent wellbore fluid during placement, it can cause: a slow setting cement plug which results in longer cementing times and increased rig costs, a contaminated cement plug top which results in the need to drill further into the plug to obtain a competent cement top, gas migration, an incompetent cement plug from top to bottom requiring a second plug attempt, and a washed away or diluted cement plug requiring a second plug attempt.

Success is also low with shallow cement plugs which tend to leak and this can be attributed to the cement plugs mixing with mud systems and/or well bore fluids. Invert plug successes also tend to be low and such poor results in most instances can be attributed to the mixing of the cement slurry with the mud system.

Success on invert foam cement jobs is also low due to gas breakout resulting in a poor foam cement job. Gas breakout on such invert foam cement jobs can also be attributed to contamination of the invert foam cement with well bore fluids.

In foam cementing, the admixture of as little as two percent of an oil-based or invert mud will de-stabilize the foam. The de-stabilization of the foam and resultant gas breakout results in higher than desired density thus increasing hydrostatic pressure, gas migration and cement fall back caused by a lower than anticipated cement top.

Therefore, a cementing composition incorporating cement, but having sufficient cohesion to avoid contamination, is desirable for cementing operations.

DESCRIPTION

A non-foamed cementing composition for sealing a subterranean zone penetrated by a well bore according to the present embodiment comprises a mixture of cementitious material ("cement"), a polymeric cement cohesion additive, and sufficient water to form a slurry.

A foamed cement composition useful in accordance with the present embodiment is comprised of a cement, a polymeric cement cohesion additive, sufficient water to form a slurry, a mixture of foaming and foam stabilizing surfactants present in an amount sufficient to foam and stabilize a foamed cement composition, and sufficient gas to form a foam.

The cementing composition according to the present embodiment can be used in a variety of cementing operations including foam cementing, plug cementing (open and cased hole), primary and squeeze cementing, cementing during drilling operations when encountering washed out zones with high leakoff and as a cement spacer additive. Preferably, the cement composition of the present embodiment is used in open hole and cased hole plug cementing as well as foam cementing in the presence of both oil-based and water-based well bore fluids.

The polymeric cement cohesion additive of the cement composition of the present embodiment maintains the cohesiveness of the cement slurry while maintaining acceptable rheological properties. The polymeric cement cohesion additive prevents contamination or mixture of the cement slurry with the well bore fluids and reduces the effects of wash out or dilution with water based and/or oil based well bore fluids. It is anticipated that when the cement composition at the leading edge of a cement plug includes the polymeric cement cohesion additive, reduced contamination and increased job success will be achieved.

The methods according to the present embodiment of cementing in subterranean zones penetrated by well bores utilizing foamed or non-foamed cement compositions containing a polymeric cement cohesion additive meet the needs described above and overcome the deficiencies of the prior art. That is, because, as noted above, the polymeric cement cohesion additive inhibits cement contamination and/or dilution with both oil-based and water-based wellbore fluids and thus increases the competency and success of the cement plug while maintaining acceptable rheological properties. Additionally, the polymeric cement cohesion additive reduces fluid loss, slightly increases the viscosity of the cement slurry and causes little or no retardation. The polymeric cement cohesion additive produces a superior cement plug, reduces failures and increases the number of successful cementing jobs on the first attempt thus reducing costly secondary jobs. In foam cementing jobs, the polymeric cement cohesion additive minimizes and/or eliminates the potential for gas breakout. The polymeric cement cohesion additive has applications for use on both land-based and off-shore cementing programs.

The polymeric cement cohesion additive can be dry blended into the cement or the polymeric cement cohesion additive can be prehydrated into the cement mix fluid, i.e. mix water, to be used for a cement plug or a liquid form of the polymeric cement cohesion additive can be added on the fly to a cement slurry.

The methods according to the present embodiment utilizing a non-foamed cement composition include the following steps. A cement composition is prepared comprised of cement, a polymeric cement cohesion additive, and sufficient water to form a slurry. The cement composition is then placed into a subterranean zone and allowed to set into a solid mass therein.

The methods according to the present embodiment utilizing a foamed cement composition are the same as described above for non-foamed cement compositions except that the prepared cement composition is comprised of a cement, a polymeric cement cohesion additive, sufficient water to form a slurry, a mixture of foaming and foam stabilizing surfactants present in an amount sufficient to foam and stabilize a foamed cement composition and sufficient gas to form a foam.

A variety of cements can be used with the present embodiment, including cements comprised of calcium, aluminum, silicon, oxygen, and/or sulfur, which set and harden by reaction with water ("hydraulic cements"). Such hydraulic cements include Portland cements, pozzolan cements, gypsum cements, aluminous cements, silica cements, and alkaline cements. Portland cements or their equivalents are generally preferred for use in accordance with the present invention when performing cementing operations in subterranean zones penetrated by well bores. Portland cements of the types defined and described in API Specification For Materials and Testing For Well Cements, API Specification 10, $5^{th}$ Edition, Jul. 1, 1990, of the American Petroleum Institute (the entire disclosure of which is hereby incorporated as if reproduced in its entirety) are preferred. Preferred API Portland cements include Classes A, B, C, G, and H, of which API Classes A, G and H are particularly preferred for the present embodiment. It is understood that the desired amount of cement is dependent on the volume required for the sealing operation.

The polymeric cement cohesion additive of the present embodiment is a high molecular weight hydroxyethylcellulose. The hydroxyethylcellulose has a molecular weight of at least 300,000 g/mol, or 1,300,000 g/mol. As will be understood, the amount of the polymeric cement cohesion additive included in the cement compositions of the present embodiment can vary depending upon the temperature of the zone to be cemented and the particular pumping time required. Generally, the polymeric cement cohesion material is included in foamed and non-foamed cement compositions in an amount of at least about 0.2% by weight of cement (bwoc) or 0.45% bwoc in the composition.

The water used to form the slurry is present in an amount sufficient to make the slurry pumpable for introduction down hole. The water used to form a slurry in the present embodiment can be fresh water or salt water. The term "salt water" is used herein to mean salt solutions ranging from unsaturated salt solutions to saturated salt solutions, including brines and seawater. Generally, any type of water can be used, provided that it does not contain an excess of compounds well known to those skilled in the art, that adversely affect properties of the cementing composition. Generally, the water is present in the cement compositions in an amount in the range of from about 25% to about 170% by weight of the cement therein, so as to yield cement compositions having a density of from about 11.6 lb/gal to about 19.2 lb/gal.

A variety of additives may be added to the cementing composition to alter its physical properties. Such additives may include slurry density modifying materials (e.g., silica flour, silica fume, sodium silicate, microfine sand, iron oxides and manganese oxides), dispersing agents, set retarding agents, set accelerating agents, fluid loss control agents, strength retrogression control agents, viscosifying agents, foaming agents and foam stabilizing agents well known to those skilled in the art.

When a foamed cement composition is utilized, a mixture of foaming and foamed stabilizing surfactants present in an amount sufficient to form and stabilize a foamed cement composition is included in the cement composition. A preferred mixture of foaming and foam stabilizing surfactants for use in accordance with the present embodiment is comprised of an ethoxylated alcohol ether sulfate of the formula $H(CH_2)_a(OC_2H_4)_bOSO_3NH_4^+$ wherein a is an integer in the range of from about 6 to about 10 and b is an integer in the range of from about 3 to about 10, an alkyl or alkene amidopropylbetaine having the formula $R-CONHCH_2CH_2CH_2N^+(CH_3)_2CH_2CO_2^-$ wherein R is a radical selected from the group of decyl, cocoyl, lauryl, cetyl and oleyl and an alkyl or alkene amidopropyldimethylamine oxide having the formula $R-CONHCH_2CH_2CH_2N^+(CH_3)_2^-$ wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropylbetaine is generally present in the mixture in an amount in the range of from about 30 to about 33 parts by weight and the alkyl or alkene amidopropyldimethylamine oxide is generally present in the additive in an amount in the range of from about 3 to about 10 parts by weight. In order to make the surfactant mixture more easily combinable with the cement slurry, water can be combined with the mixture in an amount sufficient to dissolve the surfactants.

The most preferred foaming and foam stabilizing surfactant mixture of the type described above for use in accordance with this embodiment is comprised of an ethoxylated alcohol ether sulfate wherein a in the formula set forth above is an integer in the range of from 6 to 10 and the ethoxylated alcohol ether sulfate is present in the surfactant mixture in an amount of about 63.3 parts by weight; the alkyl or alkene amidopropylbetaine is cocoylamidopropylbetaine and is present in the mixture in an amount of about 31.7 parts by weight and the alkyl or alkene amidopropyldimethylamine oxide is cocoylamidopropyldimethylamine oxide and is present in an amount of about 5 parts by weight.

The mixture of foaming and foam stabilizing surfactants is generally included in the foamed cement composition as a 30% to 50% aqueous solution in an amount in the range of from about 0.5% to about 5% by volume of water in the cement slurry, preferably in an amount of from about 1% to about 3%.

The gas utilized for foaming the cement slurry can be air or nitrogen, with nitrogen being preferred. The gas is present in an amount sufficient to foam the slurry, generally in an amount in the range of from about 10% to about 35% by volume of the slurry.

A particularly preferred foamed cement composition for use in accordance with this embodiment is comprised of Portland cement; a polymeric cement cohesion additive present in an amount of at least 0.3% by weight of cement in the composition; sufficient water to form a slurry; a mixture of foaming and foam stabilizing surfactants comprised of an ethoxylated alcohol ether sulfate present in the mixture in an amount of about 63.3 parts by weight; cocoylamidopropylbetaine present in the mixture in an amount of about 31.7 parts by weight and cocoylamidopropyldimethylamine oxide present in the mixture in an amount of about 5 parts by weight; the mixture being present in the cement composition as a 30% to 50% aqueous solution in an amount in the range of from about 1% to about 3% by volume of water in the cement composition; and sufficient gas to form a foam.

The water used is preferably included in the above described foamed cement composition in an amount in the range of from about 35% to about 55% by weight of hydraulic cement therein and the gas, preferably nitrogen, is preferably present in the composition in an amount in the range of from about 15% to about 30% by volume of the composition.

In order to further illustrate the methods and cement compositions of this embodiment, the following examples are given.

EXAMPLE 1

A conventional cement slurry was injected into a graduated cylinder containing water. The slurry immediately disseminated throughout the water, thus diluting and contaminating the sample. Upon standing, the sample settled, however, the sample was contaminated and diluted with water. Once the conventional cement slurry settled, the volume had almost doubled. The increased volume was due to water dilution/contamination. Upon the slurry setting, decreased compressive strength resulted from the dilution/contamination effect of the water.

EXAMPLE 2

Cement compositions including hydroxyethylcellulose (HEC) additives of different molecular weight were tested to determine the effectiveness of their cohesive properties while maintaining acceptable rheological properties. A cement slurry was determined to have acceptable cohesive properties under laboratory test conditions as follows. A cement slurry containing HEC was aspirated into a syringe. The cement slurry was then injected into a water-filled graduated cylinder. The slurry maintained the diameter of the aperture from which it was extruded and formed a long malleable string while falling to the bottom of the graduated cylinder. It did not readily disperse or commingle with the water. Once the slurry began to mound on the bottom of the graduated cylinder it formed one cohesive mass. Those cement slurries that fell from the syringe to the bottom of the water-filled graduated cylinder without dispersing into the water or gain substantial volume due to dilution/contamination, were determined to have acceptable cohesive properties.

The specific procedure was as follows:
1) 200 mL of tap water was placed in a 250 mL graduated cylinder.
2) A cement blend (0:1:0 Class G Cement (1895 kg/m$^3$, Water Requirement 0.44 m$^3$/t and Yield 0.77 m$^3$/t)+X % HEC) was mixed for 2 minutes at 2000 rpm in a Waring blender jar.
3) Using a 60 mL syringe, 50 mL of slurry was obtained.
4) The tip of the syringe was submerged just below the surface of the water and the slurry was slowly extruded into the graduated cylinder.
5) The heights of both cement and intermediate phase right after the slurry was placed in the graduated cylinder and these values were recorded for T=0 min.
6) The heights of both cement and intermediate phase were then recorded at T=5 min, 10 min, 20 min, 30 min and 60 min.
7) During the first 5 minutes of each test, rheology readings were recorded from the remaining slurry at 600 rpm, 300 rpm, 200 rpm, 100 rpm, 6 rpm and 3 rpm. The rheology readings were taken using a Fann 35 viscometer with a F1 spring, B1 bobb and R1 rotor.

Four different HEC additives of different molecular weight were tested to determine their relative effectiveness as a cement cohesion additive while maintaining acceptable rheological properties. In addition, the HEC additives were tested at a rate of 0.5% bwoc and 0.25% bwoc. The specific HEC additives each of which is commercially available from Hercules Incorporated—Aqualon Division, Houston, Tex. were as follows:

HEC 250 HHR having a molecular weight of 1,300,000 g/mol;

HEC 250 GXRCP having a molecular weight of 300,000 g/mol;

HEC 250 LR PA having a molecular weight of 90,000 g/mol; and

HEC 250 JR which is a blend of two HEC additives and does not have a specific molecular weight.

The results of these tests are set forth below in Tables I–IV:

TABLE I

HEC Additives at 0.5% (bwoc)

| # | Additive | CEMENT HEIGHT (mL)/ INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 1 | HEC 250 HHR | 53/0 | 52/0 | 52/0 | 52/0 | 52/0 | 52/0 | YES |
| 2 | HEC 250 GXRCP | 53/212 | 61/200 | 60/218 | 60/218 | 50/60 | 50/68 | YES |
| 3 | HEC 250 JR | 13/234 | 20/230 | 58/230 | 46/230 | 44/230 | 46/232 | NO |
| 4 | HEC 250 LR | 68/232 | 66/230 | 62/230 | 48/229 | 46/229 | 46/228 | NO |

TABLE II

HEC Additives at 0.5% (bwoc)

| # | Additive | Rheology | | | | | |
|---|---|---|---|---|---|---|---|
| | | 600 rpm | 300 rpm | 200 rpm | 100 rpm | 6 rpm | 3 rpm |
| 1 | HEC 250 HHR | >300 | >300 | >300 | >300 | 204 | 151 |
| 2 | HEC 250 GXRCP | >300 | >300 | 243 | 150 | 43 | 38 |
| 3 | HEC 250 JR | 226 | 128 | 92 | 54 | 11 | 8 |
| 4 | HEC 250 LR | 175 | 94 | 68 | 39 | 7 | 5 |

TABLE III

HEC Additives at 0.25% (bwoc)

| # | Additive | CEMENT HEIGHT (mL)/ INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 1 | HEC 250 HHR | 52/0 | 52/0 | 54/0 | 56/0 | 56/0 | 57/0 | YES |
| 2 | HEC 250 GXRCP | 58/0 | 64/0 | 63/0 | 62/0 | 62/0 | 60/70 | NO |
| 3 | HEC 250 JR | 204/234 | 78/230 | 70/230 | 67/230 | 66/230 | 64/68 | NO |
| 4 | HEC 250 LR | 210/230 | 126/232 | 83/230 | 72/230 | 68/230 | 65/230 | NO |

TABLE IV

HEC Additives at 0.25% (bwoc)

| # | Additive | Rheology | | | | | |
|---|---|---|---|---|---|---|---|
| | | 600 rpm | 300 rpm | 200 rpm | 100 rpm | 6 rpm | 3 rpm |
| 1 | HEC 250 HHR | >300 | >300 | >300 | 231 | 52 | 39 |
| 2 | HEC 250 GXRCP | >300 | 194 | 157 | 117 | 71 | 63 |
| 3 | HEC 250 JR | 159 | 105 | 85 | 61 | 33 | 28 |
| 4 | HEC 250 LR | 149 | 95 | 75 | 52 | 25 | 21 |

Based on the results set forth in Tables I–IV, the higher molecular weight HEC additives, namely HEC 250 HHR which has a molecular weight of 1,300,000 g/mol was found to be an effective cement cohesion additive at concentrations of 0.25% bwoc and 0.50% bwoc while HEC 250 GXRCP which has a molecular weight of 300,000 g/mol was found to be an effective cement cohesion additive at a concentration of 0.50% bwoc. The lower molecular weight HEC additive, namely HEC 250 LR PA which has a molecular weight of 90,000 g/mol. and blend of two HEC additives that did not have a specific molecular weight, namely HEC 250 LR were found not to be effective cement cohesion additives at the concentrations tested, i.e. 0.25% and 0.50% bwoc.

Further tests were conducted with HEC 250 HHR and HEC 250 GXRCP at various concentrations as set forth in Tables V–VIII as follows:

TABLE V

HEC 250 HHR

| # | % (bwoc) | CEMENT HEIGHT (mL)/ INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 1 | 0.50% | 53/0 | 52/0 | 52/0 | 52/0 | 52/0 | 52/0 | YES |
| 5 | 0.25% | 52/0 | 52/0 | 54/0 | 56/0 | 56/0 | 57/0 | YES |
| 9 | 0.20% | 52/224 | 54/223 | 55/224 | 57/223 | 57/222 | 58/220 | YES |
| 10 | 0.15% | 56/220 | 60/218 | 60/218 | 62/222 | 65/220 | 58/70 | NO |
| 11 | 0.10% | 60/232 | 66/232 | 65/231 | 66/230 | 66/228 | 68/226 | NO |
| 12 | 0.05% | 64/238 | 67/230 | 62/230 | 62/230 | 61/230 | 60/63 | NO |

TABLE VI

HEC 250 HHR

Rheology

| # | % (bwoc) | 600 rpm | 300 rpm | 200 rpm | 100 rpm | 6 rpm | 3 rpm |
|---|---|---|---|---|---|---|---|
| 1 | 0.50% | >300 | >300 | >300 | >300 | 204 | 151 |
| 5 | 0.25% | >300 | >300 | >300 | 231 | 52 | 39 |
| 9 | 0.20% | >300 | >300 | 248 | 163 | 44 | 35 |
| 10 | 0.15% | >300 | 210 | 159 | 103 | 45 | 41 |
| 11 | 0.10% | 246 | 144 | 112 | 74 | 49 | 42 |
| 12 | 0.05% | 161 | 107 | 91 | 69 | 34 | 25 |

TABLE VII

HEC 250 GXRCP

| # | % (bwoc) | CEMENT HEIGHT (mL)/ INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 2 | 0.50% | 53/212 | 61/220 | 60/218 | 60/218 | 50/60 | 50/68 | YES |
| 13 | 0.45% | 62/240 | 70/240 | 67/240 | 66/238 | 65/238 | 64/230 | YES |
| 14 | 0.35% | 58/228 | 66/230 | 64/225 | 64/224 | 64/224 | 62/74 | NO |
| 6 | 0.25% | 58/0 | 64/0 | 63/0 | 62/0 | 62/0 | 60/70 | NO |
| 15 | 0.15% | 60/230 | 78/230 | 73/228 | 70/220 | 69/220 | 67/0 | NO |

TABLE VIII

HEC 250 GXRCP

Rheology

| # | % (bwoc) | 600 rpm | 300 rpm | 200 rpm | 100 rpm | 6 rpm | 3 rpm |
|---|---|---|---|---|---|---|---|
| 2 | 0.50% | >300 | >300 | 243 | 150 | 43 | 38 |
| 13 | 0.45% | >300 | 270 | 203 | 126 | 42 | 39 |
| 14 | 0.35% | >300 | 265 | 205 | 138 | 69 | 62 |
| 6 | 0.25% | >300 | 194 | 157 | 117 | 71 | 63 |
| 15 | 0.15% | 182 | 123 | 100 | 74 | 43 | 36 |

Based on the results set forth in Tables V–VIII, the HEC additive having a molecular weight of 1,300,000 g/mol, namely HEC 250 HHR, was found to be an effective cement cohesion additive at concentrations of at least 0.20% bwoc while the HEC additive which having a molecular weight of 300,000 g/mol, namely HEC 250 GXRCP, was found to be an effective cement cohesion additive at concentrations of at least 0.45% bwoc.

Further tests were conducted with mixtures of HEC 250 HHR and HEC 250 GXRCP at ratios of 2:1, 1:1 and 1:2 at a concentration of 0.30% bwoc. The three blends were tested as dry-blended additives and as additives that were prehydrated in cement mix water. For the "prehydration" tests, step 2 in the above procedure was modified such that the water and HEC additive were mixed for 1 minute at 2000 rpm in the Waring blender to hydrate the additive, then the cement was added and mixing was continued for 2 minutes at 2000 rpm. The results of these tests are set forth in Tables IX–XIV as follows, wherein Tables XIII and XIV show the ratio of HEC 250 GXRCP and HEC 250 HHR at a 2:1 ratio but at varying concentrations of 0.3%, 0.25%, 0.2%, 0.15% and 0.1% bwoc.

TABLE IX

HEC 250 GXRCP and HEC 250 HHR Combined

| # | % (bwoc) | CEMENT HEIGHT (mL)/ INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 16 | 0.1% GXRCP + 0.2% HHR | 53/230 | 55/228 | 55/228 | 56/228 | 58/226 | 59/226 | YES |
| 17 | 0.2% GXRCP + 0.1% HHR | 52/230 | 65/230 | 64/230 | 64/230 | 64/230 | 62/230 | NO |
| 18 | 0.15% GXRCP + 0.15% HHR | 56/230 | 60/230 | 61/230 | 62/228 | 60/228 | 58/228 | NO |

TABLE X

HEC 250 GXRCP and HEC 250 HHR Combined

| # | % (bwoc) | Rheology | | | | | |
|---|---|---|---|---|---|---|---|
| | | 600 rpm | 300 rpm | 200 rpm | 100 rpm | 6 rpm | 3 rpm |
| 16 | 0.1% GXRCP + 0.2% HHR | >300 | >300 | >300 | 209 | 48 | 41 |
| 17 | 0.2% GXRCP + 0.1% HHR | >300 | >300 | 278 | 176 | 69 | 65 |
| 18 | 0.15% GXRCP + 0.15% HHR | >300 | >300 | >300 | 221 | 71 | 72 |

TABLE XI

HEC 250 GXRCP and HEC 250 HHR Combined (PREHYDRATED)

| # | % (bwoc) | CEMENT HEIGHT (mL)/INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 16 | 0.1% GXRCP + 0.2% HHR | 56/228 | 57/228 | 57/228 | 57/228 | 58/228 | 58/220 | YES |
| 17 | 0.2% GXRCP + 0.1% HHR | 55/234 | 60/232 | 59/230 | 59/230 | 59/230 | 58/230 | YES |
| 18 | 0.15% GXRCP + 0.15% HHR | 55/233 | 57/230 | 57/230 | 57/230 | 56/230 | 56/230 | NO |

TABLE XII

EC 250 GXRCP and HEC 250 HHR Combined (PREHYDRATED)

| # | % (bwoc) | Rheology | | | | | |
|---|---|---|---|---|---|---|---|
| | | 600 rpm | 300 rpm | 200 rpm | 100 rpm | 6 rpm | 3 rpm |
| 16 | 0.1% GXRCP + 0.2% HHR | >300 | >300 | >300 | 239 | 77 | 70 |
| 17 | 0.2% GXRCP + 0.1% HHR | >300 | >300 | 267 | 173 | 72 | 69 |
| 18 | 0.15% GXRCP + 0.15% HHR | >300 | >300 | >300 | 208 | 81 | 75 |

TABLE XIII

HEC 250 GXRCP and HEC 250 HHR Combined (PREHYDRATED)
2:1 RATIO

| # | % (bwoc) | CEMENT HEIGHT (mL)/INTERMEDIATE HEIGHT (mL) | | | | | | Exhibits Cohesion |
|---|---|---|---|---|---|---|---|---|
| | | 0 min | 5 min | 10 min | 20 min | 30 min | 60 min | |
| 17 | 0.2% GXRCP + 0.1% HHR | 55/234 | 60/232 | 59/230 | 59/230 | 59/230 | 58/230 | YES |
| 21 | 0.167% GXRCP + 0.083% HHR | 58/232 | 63/230 | 62/230 | 62/230 | 62/230 | 60/230 | NO |
| 22 | 0.133% GXRCP + 0.067% HHR | 55/242 | 74/234 | 72/230 | 71/230 | 70/230 | 69/230 | NO |
| 23 | 0.10% GXRCP + 0.05% HHR | 55/238 | 66/235 | 66/232 | 66/230 | 64/230 | 64/230 | NO |
| 24 | 0.067% GXRCP + 0.033% HHR | 52/238 | 64/234 | 62/230 | 62/230 | 61/230 | 60/230 | NO |

TABLE XIV

HEC 250 GXRCP and HEC 250 HHR Combined (PREHYDRATED) 2:1 RATIO

| # | % (bwoc) | Rheology | | | | | |
|---|---|---|---|---|---|---|---|
| | | 600 rpm | 300 rpm | 200 rpm | 100 rpm | 6 rpm | 3 rpm |
| 17 | 0.2% GXRCP + 0.1% HHR | >300 | >300 | 267 | 173 | 72 | 69 |
| 21 | 0.167% GXRCP + 0.083% HHR | >300 | >300 | 237 | 156 | 73 | 71 |
| 22 | 0.133% GXRCP + 0.067% HHR | >300 | 211 | 162 | 104 | 50 | 49 |
| 23 | 0.10% GXRCP + 0.05% HHR | >300 | 212 | 162 | 112 | 64 | 58 |
| 24 | 0.067% GXRCP + 0.033% HHR | 226 | 135 | 109 | 77 | 41 | 31 |

The results of Tables IX–XIV indicate that by combining different molecular weight HEC samples, the cement cohesion properties of the HEC samples can be increased while reducing the concentration of the individual HEC samples. For instance, HEC 250 GXRCP alone was effective as a cement cohesion additive at a concentration of 0.45% while HEC 250 HHR alone was effective as a cement cohesion additive at a concentration of 0.2% (See Tables V and VII). By combining HEC 250 GXRCP and HEC 250 HHR (see blend number 17 in Tables IX–XIV which included 0.2% HEC 250 GXRCP and 0.1% HEC 250 HHR), the concentrations of the HEC samples were reduced to 0.2% and 0.1%, respectfully, without compromising the effectiveness of the blend as a cement cohesion additive.

As shown in Tables XI–XIV, prehydration of the HEC can increase the effectiveness of the cohesion properties of the cement cohesion additive. For instance, blend number 17 did not exhibit cohesion when dry blended (Table IX) but did exhibit good cohesion properties when the cement cohesion additive was prehydrated (Table XI and XIII).

Although only a few exemplars of this embodiment have been described in detail above those skilled in the art will readily appreciate that many other modifications are possible in the exemplary embodiments without materially departing from the novel teachings and advantages of this embodiment. Accordingly, all such modifications are intended to be included within the scope of this embodiment as defined in the following claims.

The invention claimed is:

1. A method of cementing in a subterranean zone comprising:
preparing a cementing composition comprising cement, a polymeric cement cohesion additive, and water;
placing the cementing composition into the subterranean zone, wherein the cementing composition comprises an effective amount of the cement cohesion additive sufficient to inhibit one or both of contamination and dilution of the cementing composition by fluids in the subterranean zone; and
allowing the cementing composition to set therein.

2. The method of claim 1 wherein the cement is Portland cement, pozzolan cement, gypsum cement, aluminous cement, silica cement, or alkaline cement.

3. The method of claim 1 wherein the cement is class A, G or H Portland cement.

4. The method of claim 1 wherein the polymeric cement cohesion additive comprises hydroxyethylcellulose having a molecular weight of at least 300,000 g/mol.

5. The method of claim 4 wherein the polymeric cement cohesion additive is present in an amount of at least 0.45 percent by weight of the cement.

6. The method of claim 1 wherein the polymeric cement cohesion additive comprises hydroxyethylcellulose having a molecular weight of at least 1,300,000 g/mol.

7. The method of claim 6 wherein the polymeric cement cohesion additive is present in an amount of at least 0.2 percent by weight of the cement.

8. The method of claim 1 wherein the polymeric cement cohesion additive comprises a mixture of hydroxyethylcellulose having a molecular weight of at least 1,300,000 g/mol. and hydroxyethylcellulose having a molecular weight of at least 300,000 g/mol.

9. The method of claim 6 wherein the polymeric cement cohesion additive is present in an amount of at least 0.3 percent by weight of the cement.

10. The method of claim 9 wherein the composition is prepared by mixing the polymeric cement cohesion additive and water to hydrate the cement cohesion additive prior to the addition of cement to the composition.

11. The method of claim 1 wherein the water is present in a range of about 25 to about 170 percent by weight of the cement.

12. The method of claim 1 wherein the cementing composition further comprises a mixture of foaming and foam stabilizing surfactants present in an amount sufficient to form and stabilize a foamed cementing composition.

13. The method of claim 12 wherein the mixture of foaming and foam stabilizing surfactants is comprised of an ethoxylated alcohol ether sulfate present in an amount of about 63.3 parts by weight, cocoylamidopropylbetaine present in an amount of about 31.7 parts by weight and cocoylamidopropyldimethylamine oxide present in an amount of about 5 parts by weight.

14. The method of claim 13 wherein the mixture of foaming and foam stabilizing surfactants in a 30% to 50% aqueous solution is present in an amount in the range of from about 1% to about 3% by volume of water therein.

15. The method of claim 12 wherein the cementing composition further comprises sufficient gas to form a foam.

16. The method of claim 15 wherein the gas is selected from the group consisting of air and nitrogen.

17. The method of claim 16 wherein the gas is present in the composition in an amount in the range of from about 15% to about 30% by volume of the composition.

18. The method of claim 1 further comprising one or more of a slurry density modifying material, dispersing agent, set retarding agent, set accelerating agent, fluid loss control agent, strength retrogression control agent, viscosifying agent, foaming agent, and foam stabilizing agent.

* * * * *